3,793,366
ESTERS OF AMINOALKOXYPHENOL AND
RELATED COMPOUNDS
John Krapcho, Somerset, N.J., assignor to E. R. Squibb
& Sons, Inc., New York, N.Y.
No Drawing. Continuation-in-part of abandoned application Ser. No. 760,083, Sept. 16, 1968. This application May 27, 1971, Ser. No. 147,262
Int. Cl. C07c 93/26
U.S. Cl. 260—477      7 Claims

ABSTRACT OF THE DISCLOSURE

This invention relates to new esters of the general formula

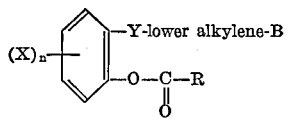

and salts of these compounds, which are useful as disinfectants, central depressants and immunosuppressive agents.

---

This application is a continuation-in-part of my application Ser. No. 760,083, filed Sept. 16, 1968 now abandoned.

SUMMARY OF THE INVENTION

This invention relates to novel compounds of the formula

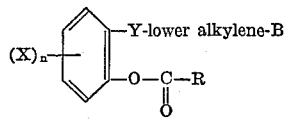

and to acid addition salts and quaternary ammonium salts thereof.

The symbols have the following meanings:

R represents $(X)_m$-phenyl or $(X)_m$-phenyl-lower alkenyl.
X represents hydrogen, halo, lower alkyl, lower alkoxy or trifluoromethyl.
Y represents oxa (—O—) or thia (—S—).
B represents a basic nitrogen-containing radical of less than 15 carbon atoms.
m represents 1 or 2.
n represents 1 or 2.

The lower alkyl groups referred to above include straight and branched chain saturated aliphatic groups of up to eight carbon atoms such as methyl, ethyl, propyl, isopropyl, butyl, isobutyl, t-butyl, amyl, isoamyl, hexyl and the like. Methyl and ethyl are preferred. The lower alkylene group is a similar aliphatic chain. The lower alkenyl groups are similar monounsaturated groups. The lower alkoxy groups contain alkyl groups of the same character attached to the oxygen atom.

Each of the four halogens is contemplated by the terms "halo," chlorine and bromine being preferred.

The acyl group

in Formula I, includes the acyl radical of a substituted or unsubstituted benzoyl or aralkenoyl group (e.g., phenyl-lower alkenoyl such as cinnamoyl) that is, R in the acyl group is $(X)_m$-phenyl or $(X)_m$-phenyl-lower alkenyl, preferably

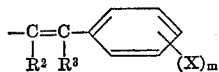

wherein $R^2$ and $R^3$ each is hydrogen or lower alkyl of one to four carbons. The cinnamoyl group is preferred and a cinnamoyl group containing a lower alkyl group of one to four carbons (preferably methyl) on either or both of the carbons adjacent to the double bond is also preferred.

The basic nitrogen containing radicals symbolized by B include the radicals of the structure (II)  

wherein each $R^1$ represents hydrogen, lower alkyl, hydroxy-lower alkyl, $(X)_n$-phenyl-lower alkyl and N-(lower alkyl)-N-[$_1(X)_n$-phenyl-(lower alkyl)] forming such basic groups as amino, lower alkylamino, e.g., methylamino, ethylamino, di(lower alkyl)amino, e.g., dimethylamino, diethylamino, dipropylamino, (hydroxy - lower alkyl) amino, e.g., hydroxyethylamino, di(hydroxy-lower alkyl) amino, e.g., di(hydroxyethyl)amino, phenyl(lower alkyl) amino, e.g., benzylamino, phenethylamino and the like.

In addition, the nitrogen may join with the groups represented by $R^1$ to form a 5 to 7 membered monocyclic heterocyclic containing, if desired, an oxygen, sulfur or an additional nitrogen atom (no more than two hetero atoms altogether). The heterocyclic group may also be substituted by one to three of the following: lower alkyl, lower alkoxy, hydroxy-lower alkyl, phenyl, lower alkylphenyl, lower alkoxy-phenyl, phenyl-lower alkyl or pyridyl, preferably one or two lower alkyl groups and only one or the other groups.

Thus heterocyclic groups represented by B include, for example, piperidino, (lower alkyl)piperidino, e.g., 2-methylpiperidino, (lower alkoxy)piperidino, e.g., 4-methoxypiperidino, (lower alkyl)piperidino, e.g., (2-methyl) piperidino, pyrrolidino, (lower alkyl)pyrrolidino, e.g., 3-methylpyrrolidino, di(lower alkyl)pyrrolidino, e.g., dimethylpyrrolidino; (lower alkoxy)pyrrolidino, e.g., 3-methoxypyrrolidino; morpholino; (lower alkyl)morpholino, e.g., 3-methylmorpholino; di(lower alkyl)morpholino, e.g., 2,3-dimethylmorpholino; (lower alkoxy)morpholino, e.g., 3-ethoxymorpholino; thiamorpholino; (lower alkyl)thiamorpholino, e.g., 2-ethylthiamorpholino; di-(lower alkyl) thiamorpholino, e.g., 2,6-dimethylthiamorpholino; (lower alkoxy) thiamorpholino, e.g., 2- or 3-methoxythiamorpholino; piperazino; (lower alkyl)piperazino, e.g., 4-methylpiperazino, 2-methylpiperazino or 3-methylpiperazino; di(lower alkyl)piperazino, e.g., 2,3-dimethylpiperazino; (lower alkoxy)piperazino, e.g., 2-ethoxypiperazino; (hydroxy-lower alkyl)piperazino, e.g., $N^4$-2-hydroxyethylpiperazino; phenyl piperazino; (lower alkyl phenyl)piperazino, e.g., (o-, m-, or p-methylphenyl)piperazino; (lower alkoxyphenyl)piperazino, e.g., (o-, m-, or p-ethoxyphenyl)piperazino; (phenyl - lower alkyl)piperazino, e.g., benzylpiperazino, phenethylpiperazino; 4-(pyridyl)piperazino; hexamethyleneimino, homopiperazino or N-alkylhomopiperazino.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, etc., and organic salts as acetate, oxalate, tartrate, maleate, citrate, succinate, benzoate, ascorbate, salicylate, theophyllinate, camphorsulfonate, alkanesulfonate, e.g., methanesulfonate or arylsulfonate, e.g., benzenesulfonate, toluenesulfonate and the like are also within the scope of the invention. Physiologically acceptable acids are, of course, employed where the salt form is prepared for therapeutic use, but the salts may also be used in the purification and isolation of the product.

Examples of quaternary ammonium salts of the free base of this invention include the lower alkyl halides (e.g., methyl chloride and ethyl bromide), the lower alkyl sulfates (e.g., methosulfate), the aralkyl halides (e.g., phenyl-lower alkyl halides such as benzyl chloride) and similar aralkyl sulfates.

The preferred compounds of Formula I are those wherein X is hydrogen, Y is oxygen, B is di-lower alkylamino and R is phenyl-lower alkenoyl. Especially preferred are those within the foregoing group wherein the lower alkylene group has 3 carbons, the di-lower alkylamino group is dimethylamino and the R is styryl, e.g., —COR is cinnamoyl, m and n each is preferably 1 when substituted radicals are included. The preferred salts are the physiologically acceptable acid addition salts among which the hydrohalides and especially the hydrochloride are foremost, and also the quaternary alkyl halides, especially the methobromide.

The compounds of this invention are prepared by reacting a phenol of the formula (III)

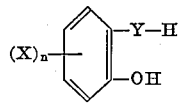

wherein Y, X and n are as defined above, with an aminoalkyl halide of the formula (IV)    hal-lower alkylene-B hal representing halogen, preferably chlorine or bromine, and B having the meaning defined above, in the presence of a strong base, such as sodamide, sodium methylate, sodium hydroxide, sodium hydride or potassium hydroxide, to yield an intermediate of the formula (V)

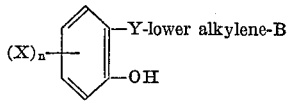

Reaction of the compound of Formula V with an acyl halide R—COCl or acid anhydride (R—CO)$_2$O, R having the meaning defined above, in an inert organic solvent such as benzene, toluene, chloroform, diethylether, or the like, yields a product of Formula I.

As an alternative to the above procedure, a starting material of the formula (VI)

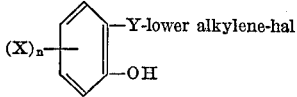

obtained from the compound of Formula III by reaction with a halo-lower alkylene halide, may be used. The compound of Formula VI may first be reacted with a primary or secondary amine to introduce the group B and obtain a compound of Formula V, which is then further treated as described above, or the compound of Formula VI is first reacted with an acyl halide RCOCl or acid anhydride (R—CO)$_2$O to introduce the acid radical and afterward reacted with an amine to introduce the basic group B.

The acid addition salt of any of these products is obtained by reacting the free base with the appropriate inorganic or organic acid and the quaternary salt is obtained by reacting with the appropriate alkylating agent.

Starting materials of the Formula III which may be utilized in the preparing compounds of this invention include: 2-hydroxyphenol; 2 - mercaptophenol; halo-2-hydroxyphenols, such as 4-chloro-2-hydroxylphenol, 4-bromo-2-hydroxyphenol, 5 - chloro-2-hydroxyphenol, 5-bromo-2-hydroxyphenol, 6 - chloro-2-hydroxyphenol, 4,6-dichloro - 2 - hydroxyphenol, and 4-bromo-6-chloro-2-hydroxyphenol; halo-2-mercaptophenol, such as 4-chloro-2-mercaptophenol, 4-bromo-2-mercaptophenol, 5-chloro-2-mercaptophenol and 4,6-dichloro-2-mercaptophenol; trifluoromethyl-2-hydroxyphenols, such as 4-trifluoromethyl-2-hydroxyphenol and 5-trifluoromethyl-2-hydroxyphenol; trifluoromethyl - 2 - mercaptophenols, such as 4-trifluoromethyl-2-mercaptophenol and 5-trifluoromethyl-2-mercaptophenol; (lower alkyl) - 2 - hydroxyphenols, such as 4-methyl-2-hydroxyphenol, 5-ethyl-2-hydroxyphenol, 4-isopropyl-2-hydroxyphenol, 5-n-hexyl-2-hydroxyphenol, 4,6-dimethyl-2-hydroxyphenol, 4,6-diethyl-2-hydroxyphenol, and 3-methyl-5-ethyl - 2 - hydroxyphenol; (lower alkyl)-2-mercaptophenols, such as 5-methyl-2-mercaptophenol, 4-ethyl-2-mercaptophenol and 4,6 - dimethyl-2-mercaptophenol.

Aminoalkyl chlorides of Formula IV which may be used include for example: amino(lower alkyl)chlorides, such as 2-aminoethyl chloride and 3-aminopropyl chloride; (lower alkyl)amino(lower alkyl)chlorides, such as methylaminomethyl chloride, 2-methylaminoethyl chloride, and 3-ethylaminopropyl chloride; di(lower alkyl)amino(lower alkyl)chlorides, such as 2-(dimethylamino)ethyl chloride, 3-(dimethylaminopropyl) chloride, 5-(diethylamino)pentyl chloride, and 2-(dipropylamino)hexyl chloride; (hydroxy-lower alkyl)amino(lower alkyl) chlorides, such as 2-(2-hydroxyethyl)aminoethyl chloride; di(hydroxy-lower alkyl)amino(lower alkyl) chlorides, such as 3-(2-hydroxyethyl)aminopropyl chloride; phenyl(lower alkyl)amino (lower alkyl) chlorides, such as 2-benzylaminoethyl chloride, 3-phenethylaminopropyl chloride, and 4-benzylaminobutyl chloride, and halo, trifluoromethyl, lower alkyl and lower alkoxy substituted phenyl derivatives thereof; N-(lower alkyl)phenyl(lower alkyl)amino chlorides, such as 2-(benzylamino)ethyl chloride, and saturated 5 to 7 membered monocyclic heterocyclic lower alkyl chlorides.

Unsubstituted and substituted benzoyl halides or phenyl-lower alkenoyl halides, which may be used include, for example: benzoyl chloride, 2,4-dimethoxybenzoyl chloride, 3-trifluoromethylbenzoyl chloride, 2-methylbenzoyl chloride, 4 - chlorobenzoyl chloride, 3,4-dimethylbenzoyl chloride, 4-methylbenzoyl chloride, 4 - methoxybenzoyl chloride, and the acid chlorides of the following acids: cinnamic acid, α-methylcinnamic acid, β-ethylcinnamic acid, p-methylcinnamic acid, o,α-dimethylcinnamic acid, p-ethylcinnamic acid 2,4-difluorocinnamic acid, o-chlorocinnamic acid, p-chlorocinnamic acid, 2,4-dichlorocinnamic acid, 4-trifluoromethylcinnamic acid, p-fluorocinnamic acid, α-(n-propyl)cinnamic acid, β-methylcinnamic acid, p-methoxycinnamic acid, etc.

The quaternary ammonium compounds of this invention are useful as antimicrobial agents, e.g., in combatting organisms such as *Staphylococcus aureus* or *Mycobacterium tuberculosis*. They may be used, for example, as surface disinfectants. About 0.1 to about 1.0% by weight of any of these substances may be incorporated in a soap or other cleansing agent such as solid or liquid detergent composition. These may be used for example in cleaning dairy, food handling or food processing equipment. The free bases and acid addition salts may be used in preparing and isolating the materials which are utilized in forming the quaternary ammonium salts.

The compounds of this invention may also be used as immunosuppressive agents, i.e., to suppress the immune response which is a defensive mechanism in warm blooded animal species against foreign bodies. Thus they may be used, for example, in autoimmune disease and in preventing rejection of organ transplants or skin grafts such as renal transplants or skin grafts in dogs or mice or in suppressing the antibody response in mice to an injection of red blood cells of sheep. The compounds may be administered orally or parenterally, e.g., subcutaneously, in the free base form or as a physiologically acceptable salt, in amounts of about 2 to 10 mg./kg. daily in single doses or two to four divided doses. These compounds are similar in action and dosage to azathioprine but may be used at higher dosage and for longer periods, if desired, because of lower toxicity and greater specificity of action.

These compounds in addition have central depressant action and may be used in the same manner and in the same amounts as chlordiazepoxide, for example, as a tranquilizer in psychoneurosis.

The following examples are illustrative of the invention. Temperatures are expressed in degrees centigrade.

EXAMPLE 1

2-[3-(dimethylamino)propoxy]phenol, ester with cinnamic acid, hydrochloride (a) 2-(3-dimethylaminopropoxy)phenol.—A slurry of 55 g. (0.5 mol.) of catechol in 150 ml. of isopropyl alcohol is added to a stirred solution of 27 g. (0.5 mol.) of sodium methylate in 850 ml. of isopropyl alcohol. A deep blue solution results, then a solid separates. The bluish mixture is stirred at room temperature for 15 minutes, treated with 270 ml. (0.56 mol.) of a 2.1 N toluene solution of 3-dimethylaminopropyl chloride, and refluxed for 6 hours. The solid gradually goes into solution as sodium chloride separates. The dark colored mixture is finally kept overnight at room temperature.

The bulk of isopropyl alcohol and toluene are evaporated, finally at 2 mm., and the cooled residue is shaken with 600 ml. of ether and 100 ml. of water. Almost all of the dark color remains in the aqueous layer. The layers are separated, the aqueous phase is extracted with ether (2× 300 ml.) and the combined ether layers are dried (MgSO$_4$). The ether is evaporated and the residue is distilled to give 54 g. of the desired phenol; B.P. 105–109°/0.2 mm.

(b) 2-[3-dimethylamino)propoxy]phenol, ester with cinnamic acid, hydrochloride.—Twenty grams (0.103 mole) of 2-(dimethylaminopropoxy)phenol from part (a) in 100 ml. of chloroform are added dropwise to 17.5 g. (0.105 mole) of cinnamoyl chloride in 100 ml. of chloroform, maintaining the temperature at 15°. The mixture is then stirred for one hour at room temperature and refluxed for one hour. The solvent is evaporated, leaving a semi-solid product which is triturated first with ether then with 250 ml. of boiling acetone to give a crystalline solid; crude yield (after cooling overnight), 28.5 g.; M.P. 134–136° (s. 130°). Crystallization from a mixture of 75 ml. of methanol and 250 ml. of ether gives 23 g. of colorless material; M.P. 136–138°.

The material is taken up in 100 ml. of water, cooled and treated with a cold solution of 8.8 g. of potassium carbonate in 50 ml. of water. The liberated base is taken up in ether (3× 150 ml.), washed with water (4× 50 ml.) and dried (MgSO$_4$). Evaporation of the ether leaves 18.4 g. of 2-[3-(dimethylamino)propoxy]phenol, ester with cinnamic acid. A cooled solution of this base in 400 ml. of ether is treated with 300 ml. of ether containing 9.1 ml. of 6.25 N alcoholic HCl to precipitate the hydrochloride as a gum which crystallizes on seeding and cooling; wt. 19 g.; M.P. 136–138°. The final yield, following crystallization from a mixture of 50 ml. of methanol and 170 ml. of ether, is 15 g.; M.P. 136–138°.

EXAMPLE 2

4-chloro-2-[3-(dimethylamino)propoxy]phenol, ester with 4-chlorocinnamic acid, hydrochloride By substituting an equivalent quantity of 4-chloro-2-hydroxyphenol for the catechol in part (a) of Example 1 to obtain 4 - chloro-2-(3 - dimethylaminopropoxy)phenol and then proceeding as in part (b) of Example 1 using an equivalent quantity of p-chlorocinnamoyl chloride instead of cinnamoyl chloride, 4-chloro-2-[3-(dimethylamino)propoxy]phenol, ester with 4-chlorocinnamic acid, and the hydrochloride, respectively, are obtained.

Similarly, by substituting the following substituted phenols for the catechol in part (a) of Example 1 and carrying out the procedure of the example, there is obtained the indicated X-2-[3-(dimethylamino)propoxy]phenol, ester with cinnamic acid product, first as the ester and then in the form of the hydrochloride salt.

| Example | Reactant | X |
|---|---|---|
| 3 | 5-methyl-2-hydroxyphenol | 5-methyl. |
| 4 | 4-bromo-2-hydroxyphenol | 4-bromo. |
| 5 | 4-trifluoromethyl-2-hydroxyphenol | 4-trifluoromethyl. |
| 6 | 4,5-dichloro-2-hydroxyphenol | 4,5-dichloro. |
| 7 | 4,5-dimethyl-2-hydroxyphenol | 4,5-dimethyl. |
| 8 | 3,4-difluoro-2-hydroxyphenol | 3,4-difluoro. |

EXAMPLE 9

2-[2-(dimethylamino)ethoxy]phenol, ester with cinnamic acid, hydrochloride

By substituting an equivalent quantity of 2-dimethylaminoethyl chloride in part (a) of Example 1 and then carrying out the procedure of part (b) of Example 1, there is obtained 2-[2-(dimethylamino)ethoxy]phenol, ester with cinnamic acid, hydrochloride.

Similarly by substituting the following basically substituted alkyl halide for the 3-dimethylaminopropyl chloride in part (a) of Example 1 and then carrying out the procedure of part (b) of Example 1, there is obtained the indicated 2-B-lower alkoxyphenol, ester with cinnamic acid, in the form of the hydrochloride salt.

| Example | Reactant | B-lower alkoxy |
|---|---|---|
| 10 | 2-piperidinoethyl chloride | 2-[2-(piperidino)ethoxy]. |
| 11 | 2-(4-methoxypiperidino)ethyl chloride | 2-[2-(4-methoxypiperidino)ethoxy]. |
| 12 | 3-pyrrolidinopropyl chloride | 2-[3-(pyrrolidino)propoxy]. |
| 13 | 2-morpholinoethyl chloride | 2-[2-(morpholino)ethoxy]. |
| 14 | 2-(3-methylmorpholino)ethyl chloride | 2-[2-(3-methylmorpholino)ethoxy]. |
| 15 | 3-thiamorpholinopropyl chloride | 2-[3-(thiamorpholino)propoxy]. |
| 16 | 3-(4-methylpiperazino)propyl bromide | 2-[3-(4-methylpiperazino)propoxy]. |
| 17 | 3-(N⁴-2-hydroxyethylpiperazino)propyl chloride | 2-[3-(N⁴-2-hydroxyethylpiperazino)propoxy]. |
| 18 | 3-(N⁴-o-methoxyphenylpiperazino)propyl chloride | 2-[3-(N⁴-o-methoxyphenylpiperazino)propoxy]. |
| 19 | 2-(N⁴-phenethylpiperazino)ethyl bromide | 2-[2-(N⁴-phenethylpiperazino)ethoxy]. |
| 20 | 2-(N⁴-α-pyridylpiperazino)ethyl chloride | 2-[2-(N⁴-α-pyridylpiperazino)ethoxy]. |
| 21 | 2-(hexamethyleneimino)butyl chloride | 2-[4-(hexamethyleneimino)butoxy]. |
| 22 | N⁴-methylhomopiperazinopropylbromide. | 2-[3-(N⁴-methylhomopiperazino)propoxy]. |

EXAMPLE 23

2-[3-(dimethylamino)propoxy]phenol, ester with benzoic acid, hydrochloride

By substituting an equivalent quantity of benzoyl chloride for the cinnamoyl chloride in part (b) of Example 1 and carrying out the procedure of that example, there is obtained 2 - [3 - (dimethylamino)propoxy]phenol, ester with benzoic acid, hydrochloride.

Similarly, by substituting for the cinnamoyl chloride the following acyl halides in part (b) of Example 1 and carrying out the procedure of that example, there is obtained the corresponding esters of 2-[3-dimethylamino)propoxy]phenol, in the form of a hydrochloride salt.

| Example | Acyl halide | Ester with— |
|---|---|---|
| 24 | 3-trifluoromethylbenzoyl chloride | 3-trifluoromethyl benzoic acid. |
| 25 | 2-methylbenzoyl chloride | 2-methylbenzoic acid. |
| 26 | 4-methoxybenzoyl chloride | 4-methoxybenzoic acid. |
| 27 | 4-chlorobenzoyl chloride | 4-chlorobenzoic acid. |
| 28 | 3,4-dimethylbenzoyl chloride | 3,4-dimethylbenzoic acid. |
| 29 | 4-fluorocinnamoyl chloride | 4-fluorocinnamic acid. |
| 30 | 2-chlorocinnamoyl chloride | 2-chlorocinnamic acid. |
| 31 | 4-ethylcinnamoyl chloride | 4-ethylcinnamic acid. |
| 32 | 2,4-difluorocinnamoyl chloride | 2,4-difluorocinnamic acid. |
| 33 | α-n-propylcinnamoyl chloride | α-n-propylcinnamic acid. |
| 34 | β-methylcinnamoyl chloride | β-methylcinnamic acid. |
| 35 | 4-methylbenzoyl chloride | 4-methylbenzoic acid. |
| 36 | 4-methoxycinnamoyl chloride | 4-methoxycinnamic acid. |

EXAMPLE 37

2-[3-(dimethylamino)propoxy]phenol, ester with cinnamic acid methobromide

A solution of 10 g. of material from part (b) of Example 1 in 100 ml. of acetonitrile is cooled and treated with 30 g. of methyl bromide. After standing for a day, the mixture is diluted with ether to give 2-[3-(dimethylamino)propoxy]phenol, ester with cinnamic acid, methobromide.

Other quaternary ammonium salts may be obtained by the same procedure utilizing other alkyl halide or aralkyl halide alkylating agents.

EXAMPLE 38

2-[4-[4-(2-hydroxyethyl)piperazino]butoxy]phenol, ester with cinnamic acid (a) 2-(4-chlorobutoxy)phenol.—Utilizing the procedure of part (a) of Example 1 but substituting an equivalent quantity of tetramethylene chlorobromide for the 3-dimethylaminopropyl chloride, 2-(4-chlorobutoxy)phenol is obtained.

(b) 2-(4-chlorobutoxy)phenol, ester with cinnamic acid.—Interaction of the material of part (a) with cinnamoyl chloride using the procedure described in Example 1, yields 2-(4-chlorobutoxy)phenol, ester with cinnamic acid.

(c) 2 - [4 - [4 - (2-hydroxyethyl)piperazino]butoxy] phenol, ester with cinnamic acid.—A solution of the material from part (b) is dissolved in methyl ethyl ketone and treated with a small quantity of potassium iodide and excess 4-(2-hydroxyethyl)piperazine. The mixture is refluxed for two hours. The solvent is removed under reduced pressure to give the product 2 - [4 - [4-(2-hydroxyethyl)piperazino]butoxy]phenol, ester with cinnamic acid.

EXAMPLE 39

2 - [4-[4-[2-(2-hydroxyethoxy)ethyl]piperazino]butoxy] phenol, ester with cinnamic acid, hydrochloride By substituting 4 - [2 - (2-hydroxyethoxy)ethyl]piperazine for the 4-(2-hydroxyethyl) piperazine in part (c) of the preceding example, 2 - [4 - [4 - [2-(2-hydroxyethoxy)ethyl]piperazino]butoxy]phenol, ester with cinnamic acid, hydrochloride, is obtained.

EXAMPLE 40

2 - [3 - (N-benzyl-N-methylaminopropoxy]phenol, ester with cinnamic acid, hydrochloride (a) 2 - (3 - chloropropoxy)phenol.—Utilizing the procedure of part (a) of Example 1, but substituting an equivalent quantity of trimethylenechlorobromide for the 3-dimethylaminopropyl chloride, 2 - (3 - chloropropoxy) phenol is obtained.

(b) 2 - [3 - (N - benzyl - N-methylamino)propoxy] phenol.—Interaction of the material from part (a) with N-methylbenzylamine in the presence of potassium iodide in the manner described in part (c) of Example 38, 2-[3-(N-benzyl-N-methylamino)propoxy]phenol is obtained.

(c) 2 - [3-(N-benzyl-N-methylamino)propoxy]phenol, ester with cinnamic acid, hydrochloride.—The product of part (b) is treated with cinnamoyl chloride according to the procedure of part (b) of Example 1, to obtain 2-[3-(N-benzyl-N-methylamino)propoxy]phenol, ester with cinnamic acid, hydrochloride.

EXAMPLE 41

2 - [3 - (methylamino)propoxy]phenol, ester with cinnamic acid, hydrochloride

A solution of the material from Example 40 in ethanol is treated with 5% palladium-carbon catalyst and placed under 3 atmospheres of hydrogen, then shaken until one equivalent of hydrogen is consumed. The mixture is filtered to remove the catalyst and the solvent removed under reduced pressure to give 2-[3-(methylamino)propoxy]phenol, ester with cinnamic acid, hydrochloride.

EXAMPLE 42

2 - [3 - (dibenzylamino)propoxy]phenol, ester with cinnamic acid, hydrochloride

Using the procedure of part (b) of Example 40, but substituting an equivalent quantity of dibenzylamine for the N-methylbenzylamine, 2 - [3 - (dibenzylamino)propoxy]phenol, ester with cinnamic acid, hydrochloride is obtained.

EXAMPLE 43

2 - (3 - aminopropoxy)phenol, ester with cinnamic acid, hydrochloride

The reaction of the product of Example 42 with two equivalents of hydrogen in the manner described in Example 41 yields 2 - (3 - aminopropoxy)phenol, ester with cinnamic acid, hydrochloride.

EXAMPLE 44

2 - [3-[bis(2-hydroxyethyl)amino]propoxy]phenol, ester with cinnamic acid, hydrochloride Using the procedure of part (c) of Example 38 but substituting an equivalent quantity of diethanolamine for the N-methylbenzylamine, 2-[3-[bis-(2-hydroxyethyl)amino] propoxy]phenol, ester with cinnamic acid, hydrochloride, is obtained.

EXAMPLE 45

2 - [3 - (diethylamino)propoxy]phenol, ester with cinnamic acid, hydrochloride (a) 2 - (3-diethylaminopropoxy)phenol.—Utilizing the procedure of part (a) of Example 1, but substituting 3-diethylaminopropyl chloride for the 3-dimethylaminopropyl chloride, 2 - (3 - diethylaminopropoxy)phenol is obtained, B.P. 127–132° (0.2 mm.); M.P. 57–59°.

(b) 2 - [3 - (diethylamino)propoxy]phenol, ester with cinnamic acid, hydrochloride.—Interaction of the material from part (a) with cinnamoyl chloride in the manner described in part (b) of Example 1 gives the colorless product, 2-[3-(diethylamino)propoxy]phenol, ester with cinnamic acid, hydrochloride, which is recrystallized from methanol-ether, M.P. 146–148°.

EXAMPLE 46

2 - [3 - (dimethylamino)propylthio]phenol, ester with cinnamic acid, hydrochloride By substituting an equivalent quantity of 2-mercaptophenol for the catechol in part (a) of Example 1 and carrying out the procedure of that example, there is obtained 2-[3-(dimethylamino)propoylthio]phenol, ester with cinnamic acid, hydrochloride.

EXAMPLE 47

2-[3-(dimethylamino)propylthio]phenol, ester with benzoic acid, hydrochloride

By substituting an equivalent quantity of 2-mercaptophenol for the catechol in part (a) of Example 1 and substituting an equivalent quantity of benzoyl chloride for the cinnamoyl chloride in part (b) of Example 1, and otherwise following the procedure of that example 2-[3-(dimethylamino)propylthio]phenol, ester with benzoic acid, hydrochloride, is obtained.

Similarly, other thiophenol esters corresponding to the oxyphenols of Examples 1 to 45 may be obtained by substituting the appropriate mercaptophenols as in Examples 46 and 47.

What is claimed is:

1. A compound of the formula

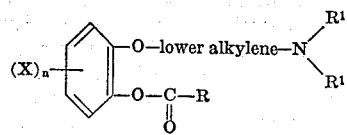

wherein R represents $(X)_m$-phenyl or $(X)_m$-phenyl-lower alkenyl, X represents hydrogen, halo, lower alkyl, or trifluoromethyl, each $R^1$ is hydrogen or lower alkyl, $m$ represents 1 or 2, $n$ represents 1 or 2, and physiologically acceptable acid addition salts and physiologically acceptable lower alkyl halide, lower alkyl sulfate, aralkyl halide and aralkyl sulfate quaternary ammoninum salts thereof.

2. A compound as in claim 1 wherein X is hydrogen, R' is lower alkyl and CO—R is cinnamoyl.

3. A compound as in claim 1 wherein X is hydrogen, R' is lower alkyl and CO—R is benzoyl.

4. A compound as in claim 2 wherein the lower alkylene group has three carbon atoms and R' is methyl.

5. A compound as in claim 2 wherein the lower alkylene group has three carbon atoms and R' is ethyl.

6. A compound as in claim 3 wherein the lower alkylene group has three carbon atoms and R' is methyl.

7. A physiologically acceptable acid addition salt of a compound of claim 2.

References Cited
FOREIGN PATENTS
1,206,148  9/1970  Great Britain _____ 260—570.7

OTHER REFERENCES
Chemical Abstracts, vol. 31, p. 6327⁹ (1937).

LORRAINE A. WEINBERGER, Primary Examiner

P. J. HAGAN, Assistant Examiner

U.S. Cl. X.R.

260—239 BB, 239 BC, 243 B, 247.1, 247.2, 268 R, 293.73, 293.82, 326.3, 473 R, 570.7; 424—246, 248, 250, 267, 274, 308